Sept. 19, 1961 C. B. DUNN 3,000,477
FISHING REEL BRAKE
Filed April 4, 1960 2 Sheets-Sheet 1

INVENTOR
Charles B. Dunn
BY
Wilkinson, Mawhinney & Theibault
ATTORNEY

INVENTOR
Charles B. Dunn

United States Patent Office 3,000,477
Patented Sept. 19, 1961

3,000,477
FISHING REEL BRAKE
Charles B. Dunn, Miami, Fla., assignor to Anglers Manufacturing Company, Miami, Fla., a corporation of Florida
Filed Apr. 4, 1960, Ser. No. 19,725
2 Claims. (Cl. 192—14)

The present invention relates to fishing reel brake and has for an object to provide an effective brake for the spool involving a simple application whereby slowing and stopping of spool rotation may be achieved easily and smoothly without incurring risks of breakage of line.

Another object of the invention is to provide a fish reel brake of highly effective character in which the thrust forces are directed axially of the spool spindle and achieve maximum application with relatively short throw.

A further object of the invention resides in providing a fishing reel brake in which the reel driving mechanism is interassociated with the brake mechanism so that the brake may be applied and shifted to "off" position without requiring any adjustment or movement in the driving device and where the driving device is put into drive relation with the spool when the brake is applied.

A still further object of the invention resides in providing a fishing reel brake in which the brake application mechanism includes therein a micrometer independent adjustment for the relative positions of the brake elements to determine desirable angular brake throw of the brake lever and also to compensate for inequalities and wear in the brake lining.

It is a still further object of the invention to achieve the foregoing results in a construction of simple and inexpensive parts associated together in a compact assembly installable without additional bulk on conventional forms of fishing reels.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
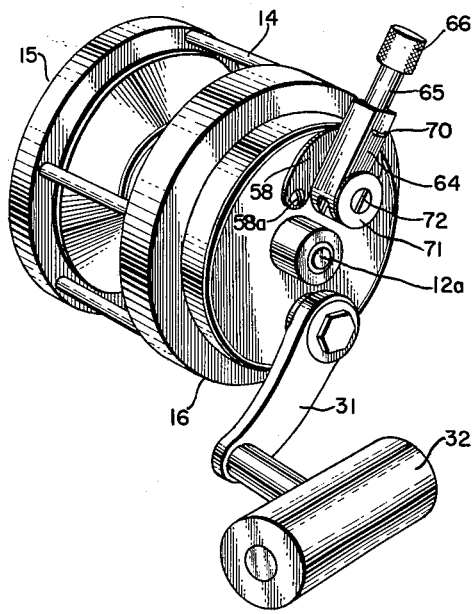
FIGURE 1 is an isometric view of a fishing reel equipped with a brake according to the present invention.

Referring more particularly to the drawings, 10 designates a conventional or other form of reel or spool mounted to rotate in a conventional support 11, including a spindle 12 having a reduced extension 12ª, a pin 13 by which the spool may be affixed to the spindle 12, a cage 14 and end heads 15 and 16 secured to the cage as by screws or other fastening means.

In the single form of the invention illustrated in the drawings, 17 represents a reel brake element or member, 18 an intermediate brake element or member and 19 an outer brake element or member. The reel brake element 17 is constituted by a flat surface on an end of the spool 10 to which is affixed friction or other brake material facing or lining 20. Similar facing or lining 21 is affixed to the inner side of the brake element or member 19.

The brake elements or members 18, 19 slide freely on the spindle extension 12ª so as to move together and to close upon the brake lining 20 of the brake element 17 in an application of the brake to the spool 10.

The intermediate brake element is biased to an open or spaced position from the lining 20 by a coil expansion spring 22 mounted in a suitable number of convolutions about the spindle extension 12ª, abutting at its inner end against the reel and at its outer end against the intermediate brake element 18, the lining 20 being cut away at its central portion, as indicated at 24, to accommodate such spring or helix 22.

Similarly a cut away central portion 25 of the opposed facing 21 accommodates a second coil expansion spring or helix 23 abutted at its inner end against the outer side of the intermediate brake element 18 and at its outer end against the inner side of the outer brake element 19.

Figures 2, 3:
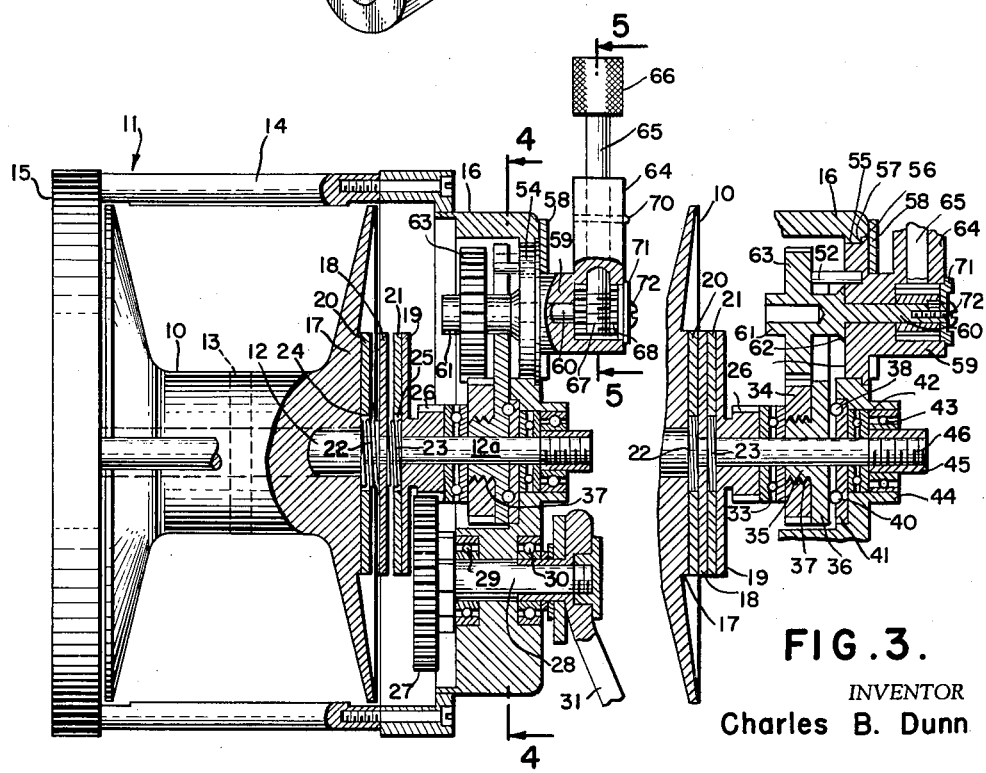
FIGURE 2 is a side elevational view taken on an enlarged scale with parts cut away and shown in section and with the brake in the open or brake-off position.
FIGURE 3 is a sectional view, being a fragment of FIGURE 2 and showing the brake in applied position.

Normally, without applied axial pressure on the brake elements, the helix 22 will shift the intermediate brake element 18 away from the facing or lining 20 and the helix 23 will axially shift the outer brake element 19 and its lining 21 outwardly on the spindle extension 12ª away from the intermediate brake element 18. This condition of the parts is shown in FIGURE 2 and is the open condition of the brake.

Carried with the outer brake element 19 and slidable therewith along the spindle extension 12ª is an outer brake element pinion 26 meshed with a drive gear wheel 27 fixed to a shaft 28 mounted in bearings 29, 30 in the end head 16. Outwardly of this end head 16 the shaft 28 has affixed thereto a drive crank arm 31 adapted to be rotated by a handle 32 (FIGURE 1).

A slidable thrust roller bearing assembly 33 is slidably mounted on the spindle extension 12ª outwardly of the pinion 26 and abutted thereagainst, and also abutted at its outer end against a driven adjustment pinion 34 movably mounted to a hollow stud 35 of a brake arm 36. The stud 35 is externally threaded to mate with internal threads on the pinion 34, these mutual threads being indicated at 37. The arm 36 and its stud 35 are also slidably mounted on the spindle extension 12ª and are adapted to be moved axially along the spindle extension in an inward direction, that is, toward the spool 10, by the action of cam balls 38 normally occupying sockets 39, 40 in the outer face of brake arm 36 and in the inner face of a fixed roller disc 41. This disc 41 is non-rotatably fitted to the end head 16. Outwardly of this disc 41 is an end thrust roller bearing 42 and outwardly of the bearing 42 is a spindle support bearing 43 pressed or otherwise fitted in a cylindrical extension 44 of the end head 16. Outwardly of the thrust bearing 42 the spindle extension 12ª is threaded, as indicated at 46, to receive an internally threaded sleeve 45 which abuts at its inner end against the thrust bearing 42 and lies inwardly of the inner race ring of the support bearing 43. This sleeve 45 will thus prevent the spindle and its extension from any casual axial movement in an inward direction.

Figures 5, 6, 7:
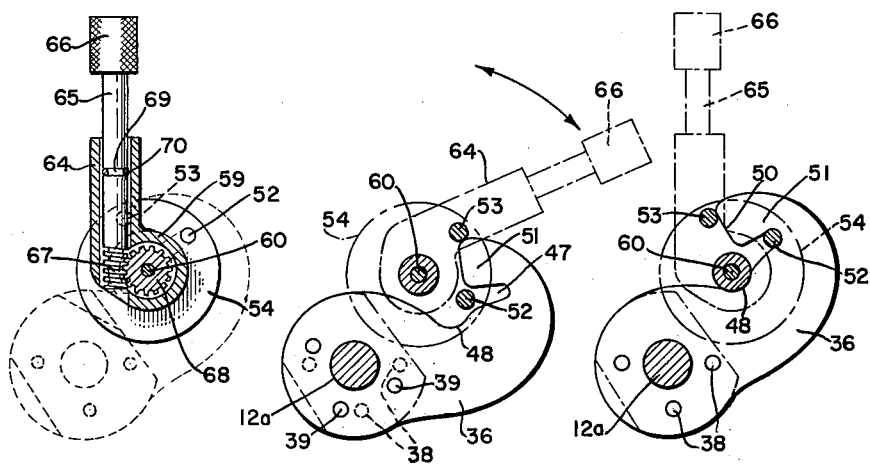
FIGURE 5 is a similar view taken on the line 5—5 in FIGURE 2.
FIGURE 6 is a diagrammatic view showing the brake-off position of the parts.
FIGURE 7 is a similar view showing the position of the same parts with the brake applied.

As more clearly appears from FIGURES 6 and 7, a slot 47 in the brake arm 36 opens inwardly to a clearance notch 48 and to a removed section opposite the notch 48 defined by the inner end 50 of such removed section. This end 50 also defines the inner end of a short wall 51 at one side of the slot 47. This construction promotes ease in assembling the brake arm 36 to an operating pin 52 and a positioning pin 53, both said pins projecting inwardly from a rotary brake driving disc 54 journalled in a bearing 55 in the end head 16. Such driving disc 54 has an outstanding flange 56 abutted against a shoulder 57 of the head 16 to avoid endwise inner movement of the disc 54. Endwise outer movement of the disc 54 is blocked by a plate 58 overlapping the flange 56 and affixed to the end head as by the screws or other fastenings 58ª.

The driving disc 54 is made in one piece with, or attached to, a hub 59, both said disc and hub as a unit being freely rotatable on a brake adjustment shaft 60 journalled through the hub 59. An inner enlarged section 61 of the adjustment shaft 60 has a flange 62 abutted against the inner side of the disc 54. The adjustment shaft 60 has made in one piece therewith, or attached thereto, an adjustment drive gear wheel 63 meshing with the pinion 34.

A tubular brake lever 64 extends angularly off the hub 59 and receives therein a rotary adjusting rod 65 having at its outer end a knurled external head 66 and at its inner end a worm 67 meshing with a worm wheel 68 fast on the brake adjustment shaft 60. An annular groove in the rod 65 within the confines of the tubular lever 64 receives a locking staple 70 to prevent axial sliding movement of the rod in the tubular lever, but to permit free rotation thereof.

An end thrust plate 71 overlapping the lever 64 is attached by a screw or other fastening 72 threaded into the end of the adjustment shaft 60 to prevent endwise movement of the shaft 60 in an inward direction.

Figure 4:
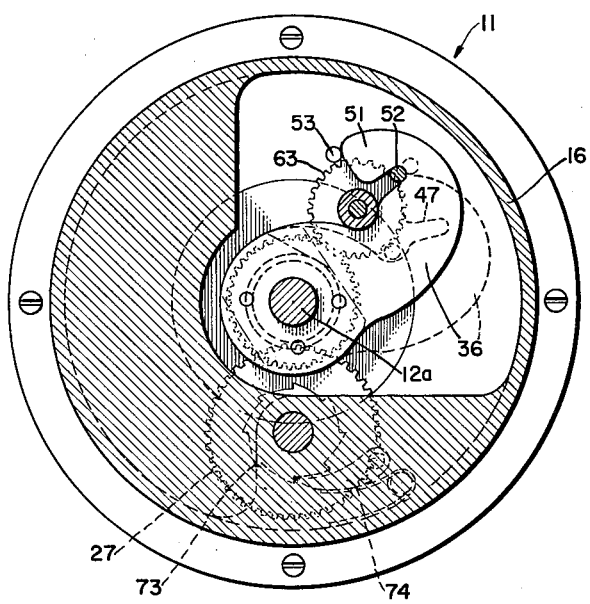
FIGURE 4 is a cross-sectional view taken on the line 4—4 in FIGURE 2.

As more particularly appears in FIGURE 4, the usual ratchet wheel 73 is mounted to the gear wheel 27 having a spring pressed pawl or dog 74 applied thereto and mounted on the reel support, as shown in FIGURE 4.

In operation, and assuming the parts to be in the brake-off position of FIGURE 2 with the brake elements 17, 18 and 19 separated under the expansive action of the spring helices 22, 23, the brake is applied to the position of FIGURE 3 by swinging the lever 64, 66 from the positions of FIGURES 5 and 6 down to that of FIGURE 7. This constitutes an angular throw of the brake lever 64, 66 which involves a rotation of both the rotary driving disc 54 and the adjustment drive gear wheel 63 as a unit. The disc 54 is driven inasmuch as both it and the lever 64 are in common connected to the rotary hub 59. The adjustment gear wheel is correspondingly rotated due to the fact that the intermeshed worm 67 and worm wheel 68, which is fast on brake adjustment shaft 60 are rotated with the brake lever 64.

Incident to this angular movement of the brake lever 64, 66, the pin 52 of the disc 54 is rotated, carrying with it the brake arm 36. Due to the fact that the pin 52 is rotating angularly about the adjustment shaft 60 and the brake arm 36 is rotating about the spindle extension 12ª, the pin 52 and its slot 47 in the brake arm 36 will describe separate arcs about relatively displaced centers. The positioning pin 53 will also engage beneath the end surface 50 of the short wall 51 and tend to push the brake arm 36 also in this clockwise direction as viewed in FIGURES 6, 7.

In FIGURE 6 the cam balls 38 are shown as occupying the sockets 39 but as the brake arm 36 moves down to the position of FIGURE 7, the balls are forced out of the sockets and onto the flat outer surface of the arm 36, for which also compare FIGURES 2 and 3. Incident to this movement the balls 38 will cam the arm 36 inwardly along the spindle extension 12ª, pushing before it the adjustment pinion 34, the roller bearing 33, the pinion 26 and its entrained brake disc or element 19. The result will be the closing of the brake elements and the compression of the spring helices 22, 23.

In executing this movement the adjustment drive gear wheel 63 will not partake of any axial movement but the teeth thereof will permit axial movement of the enmeshed driven adjustment pinion 34. During this motion there will be no relative movement between the pinion 34 and the stud 35 of the brake arm 36. The pinion 34 will be simply carried along inwardly with the stud 35 and the arm 36.

When the brake is so applied, the paying out of the line will be slowed down and finally arrested on maximum application. Also when the brake acting as a clutch is thus applied the outer brake element pinion 26 has slid along relatively to the drive gear wheel 27, but both pinion and gear wheel remain in mesh so that rotation of the handle 32 may now cause driving rotation of the spool 10 in a direction to wind in the line.

By reversing the angular stroke of the brake lever 64, 66 from the position of FIGURE 7 back clockwise to the position of FIGURES 5, 6, the brake arm 36 will be rotated back to a position where the sockets 39 thereof register with the sockets 40 in the disc 41 and accordingly the balls 38 may re-enter such realigned sockets 39. Thereupon due to the potential energy stored in the compressed helical springs 22, 23, the parts will be shifted outwardly on the spindle extension 12ª to the position of FIGURE 2, freeing the reel for independent rotation.

A micrometer adjustment is permitted by rotating the adjusting rod 65 in the tubular handle 64 by which the worm 67 is rotated, communicating a rotary movement to the worm wheel 68 and shaft 60 which communicates a like rotary movement to the adjustment drive gear wheel 63. Due to its mesh with the driven adjustment pinion 34, rotation of this gear wheel 63 will cause a corresponding opposite rotation in the driven pinion 34 causing the same to rotate relatively to its supporting stud 35. Due to the threaded connection 37 the pinion 34 will move inwardly or outwardly according to the direction of rotation of the adjusting rod 65. During this time the stud 35 and the brake arm 36 are held motionless by the engagement of the pins 52 and 53 therewith. On motion of the pinion 34 inwardly, the same will drive the roller bearing 33 before it axially along the spindle extension 12ª and thus move the clutch elements 17, 18 and 19 into a closer relationship which, for instance, may compensate for wear in the brake linings. Thus with a predetermined fixed angular throw of the brake lever 64, 66, the brake may be applied with equal pressure without regard to thick or thin conditions of the linings. When new linings are installed through this micrometer adjustment, the pinion 34 may be moved to the outermost position of FIGURE 2 where it abuts the arm 36.

Although I have disclosed herein the best form of the invention known to me at this time, I reserve the right to all such modifications and changes as may come within the scope of the following claims.

What is claimed is:

1. For use with a fishing reel and its support including a spindle extension, a brake-clutch mechanism comprising relatively movable brake elements on said reel and spindle extension, a brake shifting member rotatable and slidable along the extension, means engaging said member to cause slidable movement on rotation to energize the brake-clutch mechanism, said member having a cutaway portion opening through one side thereof and having a slot opening at its inner end into the cutaway portion and further having a short wall along one side of the slot having an inner edge exposed on the cutaway portion, a rotary disc mounted beside the cutaway portion of said member, a pin projecting from the disc positioned to slide in said slot, a second pin projecting from the disc angularly displaced from the first-named pin positioned to ride along the edge of the short wall, a brake lever connected to the disc for rocking the same through a pre-selected angular motion to cause the member to rotate and incidental to its rotary motion to slide axially along the spindle toward and from the brake-clutch mechanism.

2. A brake-clutch mechanism as claimed in claim 1, further comprising an externally threaded stud projecting from said member concentrically with the spindle extension toward the movable brake elements, a pinion having internal threads mounted on the externally threaded stud for relative rotary movement thereon and consequent axial movement relatively to the stud and member toward and from the movable brake elements, a gear wheel in mesh with the pinion, and means connected to the brake lever for rotating said gear wheel.

References Cited in the file of this patent

UNITED STATES PATENTS

| | | |
|---|---|---|
| 2,255,703 | Grieten | Sept. 9, 1941 |
| 2,262,708 | Lambert | Nov. 11, 1941 |